United States Patent
Reina

(10) Patent No.: US 7,512,155 B2
(45) Date of Patent: Mar. 31, 2009

(54) FRAMING STRUCTURE ALLOWING FLEXIBLE ALLOCATION OF OVERHEAD CHANNEL

(75) Inventor: Guy Reina, Givatayim (IL)

(73) Assignee: STMicroelectronics Ltd., Netanya (IL)

( * ) Notice: Subject to any disclaimer, the term of this patent is extended or adjusted under 35 U.S.C. 154(b) by 778 days.

(21) Appl. No.: 11/056,695

(22) Filed: Feb. 11, 2005

(65) Prior Publication Data

US 2005/0213613 A1    Sep. 29, 2005

Related U.S. Application Data

(60) Provisional application No. 60/557,803, filed on Mar. 29, 2004.

(51) Int. Cl.
H04J 15/00 (2006.01)
H04J 3/16 (2006.01)
H04J 3/22 (2006.01)
H04J 3/24 (2006.01)

(52) U.S. Cl. ............... 370/473; 370/464; 370/470; 370/474

(58) Field of Classification Search ............... 370/212, 370/370, 280, 509, 338, 466, 470, 472, 473, 370/474, 464
See application file for complete search history.

(56) References Cited

U.S. PATENT DOCUMENTS

| | | | | |
|---|---|---|---|---|
| 5,319,707 | A * | 6/1994 | Wasilewski et al. | 380/212 |
| 5,329,524 | A * | 7/1994 | Paker et al. | 370/370 |
| 5,923,648 | A * | 7/1999 | Dutta | 370/280 |
| 6,836,485 | B1 * | 12/2004 | Bendak et al. | 370/509 |
| 7,260,109 | B1 * | 8/2007 | Ovard et al. | 370/466 |
| 2002/0075902 | A1 | 6/2002 | Abbas et al. | |
| 2002/0080824 | A1 * | 6/2002 | Wingrove | 370/509 |
| 2003/0231610 | A1 * | 12/2003 | Haddad | 370/338 |

FOREIGN PATENT DOCUMENTS

| WO | 00/01127 | | 1/2000 |
|---|---|---|---|
| WO | WO 00/01127 | * | 1/2000 |
| WO | 01/84796 | | 11/2001 |

OTHER PUBLICATIONS

U.S. Appl. No. 60/557,803, entitled Framing Structure Allowing Flexible Allocation of Overhead Channel, filed Mar. 29, 2004.
ITU-T Recommendation G.992.3, entitled Series G: Transmission Systems and Media, Digital Systems and Networks; Digital Sections (2002).

* cited by examiner

Primary Examiner—Edan Orgad
Assistant Examiner—Christopher T Wyllie
(74) Attorney, Agent, or Firm—Darby & Darby PC

(57) ABSTRACT

Digital data is transmitted in a block-based hyperframe that consists of N frames. Each frame carries multiplexed data from one or more user data channels and a control channel. Control channel information is unequally allocated among the N frames, the amount of information carried in each frame varying according to the frame's position in the hyperframe. All of the user data channels except one carry a predetermined number of transmission units in each frame. The excepted user data channel carries a calculated amount needed to round out the particular frame. Following multiplexing, a block encoder defines the frames and adds error detection or error correction information. The number of frames per hyperframe and the total number of transmission units for the control channel are available to a receiver, which can then demultiplex the hyperframe.

14 Claims, 3 Drawing Sheets

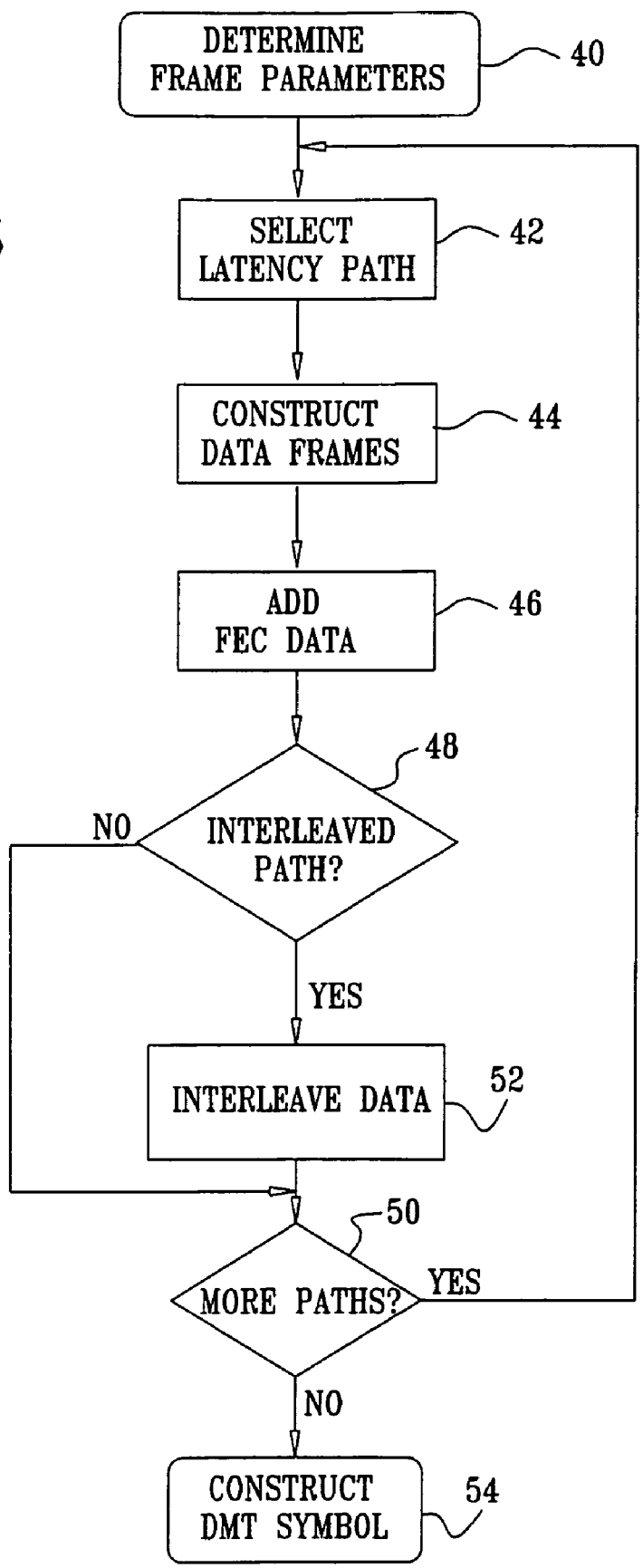

FRAMING STRUCTURE ALLOWING FLEXIBLE ALLOCATION OF OVERHEAD CHANNEL

CROSS-REFERENCE TO RELATED APPLICATIONS

This application claims the benefit of U.S. Provisional Patent Application No. 60/557,803, filed Mar. 29, 2004, which is incorporated herein by reference.

BACKGROUND OF THE INVENTION

1. Field of the Invention

This invention relates generally to high-speed digital communication systems. More particularly, this invention relates to a method and apparatus for flexible allocation of overhead rate in communications systems using a block-based framing structure.

2. Description of the Related Art

The meanings of acronyms and certain terminology used herein are given in Table 1.

TABLE 1

| | |
|---|---|
| ADSL | Asymmetric Digital Subscriber Line |
| ATM | Asynchronous Transfer Mode |
| DMT | Discrete Multitone Modulation |
| FDF | Forward Error Correction Data Frame |
| FEC | Forward Error Correction |
| FEQ | Frequency Domain Equalizer |
| FFT | Fast Fourier Transform |
| IFFT | Inverse Fast Fourier Transform |
| PCM | Pulse Code Modulation |
| QAM | Quadrature Amplitude Modulation |
| RS | Reed-Solomon |
| SNR | Signal-to-noise ratio |
| VDSL | Very High Speed Digital Subscriber Line |
| MDF | Multiplexer Data Frame |
| STM | Synchronous Transport Module |

Discrete multitone (DMT) modulation is used in many types of data communication systems, among them multicarrier, very high speed digital subscriber line (VDSL) modems, as well as asymmetric digital subscriber line (ADSL). In these systems, N tones or subcarriers are modulated by quadrature amplitude modulation (QAM) two-dimensional input frequency-domain symbols. A 2N-point inverse fast Fourier transform (IFFT) then produces a corresponding time-domain symbol, expressed as a real baseband time-domain output signal of 2N real samples in each symbol period. At the receiving side, 2N samples are extracted from the time-domain signal during each symbol period. A fast Fourier transform (FFT) is used to demodulate the signal and recover the original QAM symbols on the N tones.

For example, ADSL uses 256 or 512 tones in a downlink. ADSL standards are described in further detail, for example, in the document, ITU-T Recommendation G.992.3, entitled *Series G: Transmission Systems and Media, Digital Systems and Networks; Digital Sections*, which is herein incorporated by reference.

A frame is typically a set of octets or other basic units, which is constructed by multiplexing different data bearers and overhead data in a predefined manner. A frame may be transmitted in one DMT symbol, or may span several symbols. Constraints imposed by conventional framing structures hamper the maintenance of fine control of the rate of information transmission on the control channel.

SUMMARY OF THE INVENTION

According to a disclosed embodiment of the invention an improved framing structure is provided that allows for improved fine control over the bandwidth assigned for overhead channels. In alternate embodiments, the framing structure also enables flexible user data allocation.

The framing structure is a block-based hyper-frame that consists of one or more frames. Each of the frames carries multiplexed data from one or more user data channels and a control channel. The allocation of control channel information among the frames is related to the total number of octets, or other basic transmission units, that are required to be transmitted in a hyperframe. This total is unequally allocated among the frames, varying in each frame according to the frame's position in the hyperframe. All of the user data channels except one carry a predetermined number of transmission units in each frame. The excepted user data channel carries a calculated amount of information that is needed to round out the particular frame. Following multiplexing a block encoder defines a hyperframe, and adds error detection or error correction information. The number of frames per hyperframe and the total number of transmission units for the control channel are available to a receiver, which can then demultiplex the hyperframe.

The invention provides a method of digital communication by transmitting multiplexed user data from user data channels and control data from a control channel, which is carried out by assigning a first number of basic transmission units to the control channel, assigning, responsively to the first number, a second number of the basic transmission units to a selected one of the user data channels, and assigning respective third numbers of the basic transmission units to all other user data channels. The method is further carried out by multiplexing the first number of the basic transmission units of the control channel, the second number of the basic transmission units of the user data channels, and the third numbers of the basic transmission units of the user data channels to define a first data frame. Using new control data from the control channel and new user data from the user data channels, the steps of assigning a first number, assigning a second number, and multiplexing are repeated to define one or more second data frames. The first data frame and the second data frames are transmitted to a receiver.

According to one aspect of the method, the first number of the first data frame differs from the first number of the second data frame.

A further aspect of the method assigning a first number includes assigning a total number of the basic transmission units from the control channel to be transmitted in a hyperframe, and allocating the total number unequally among the first data frame and the second data frame.

According to another aspect of the method, the first data frame and the second data frame each have a respective index in a hyperframe, and the first number of the first data frame and the first number of the second data frame are calculated according to the respective index thereof.

According to yet another aspect of the method, the second number depends on the first number.

According to still another aspect of the method, the selected one of the user data channels has a highest index number among the user data channels.

According to an additional aspect of the method, the selected one of the user data channels has a lowest index number among the user data channels.

According to one aspect of the method, the basic transmission units are octets.

The invention provides a transmission apparatus for transmitting multiplexed user data from user data channels and control data from a control channel, including a multiplexer, operative to perform the steps of assigning a first number of basic transmission units to the control channel, assigning, responsively to the first number, a second number of the basic transmission units to a selected one of the user data channels, assigning respective third numbers of the basic transmission units to all others of the user data channels. The multiplexer is operative to multiplex the first number of the basic transmission units of the control channel, the second number of the basic transmission units of the user data channels, and the third numbers of the basic transmission units of the user data channels to define a first data frame. Using new control data from the control channel and new user data from the user data channels, the multiplexer is operative for repeatedly assigning the first number, assigning the second number, and multiplexing the data units to define a second data frame. The system includes a block encoder operative to assemble an output of the multiplexer into a hyperframe for transmission thereof to a receiver.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 3 is a flow chart describing construction of a DMT symbol by multiplexing different user data bearers and overhead data using framing parameters in accordance with a disclosed embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Overview.

Figure 1:
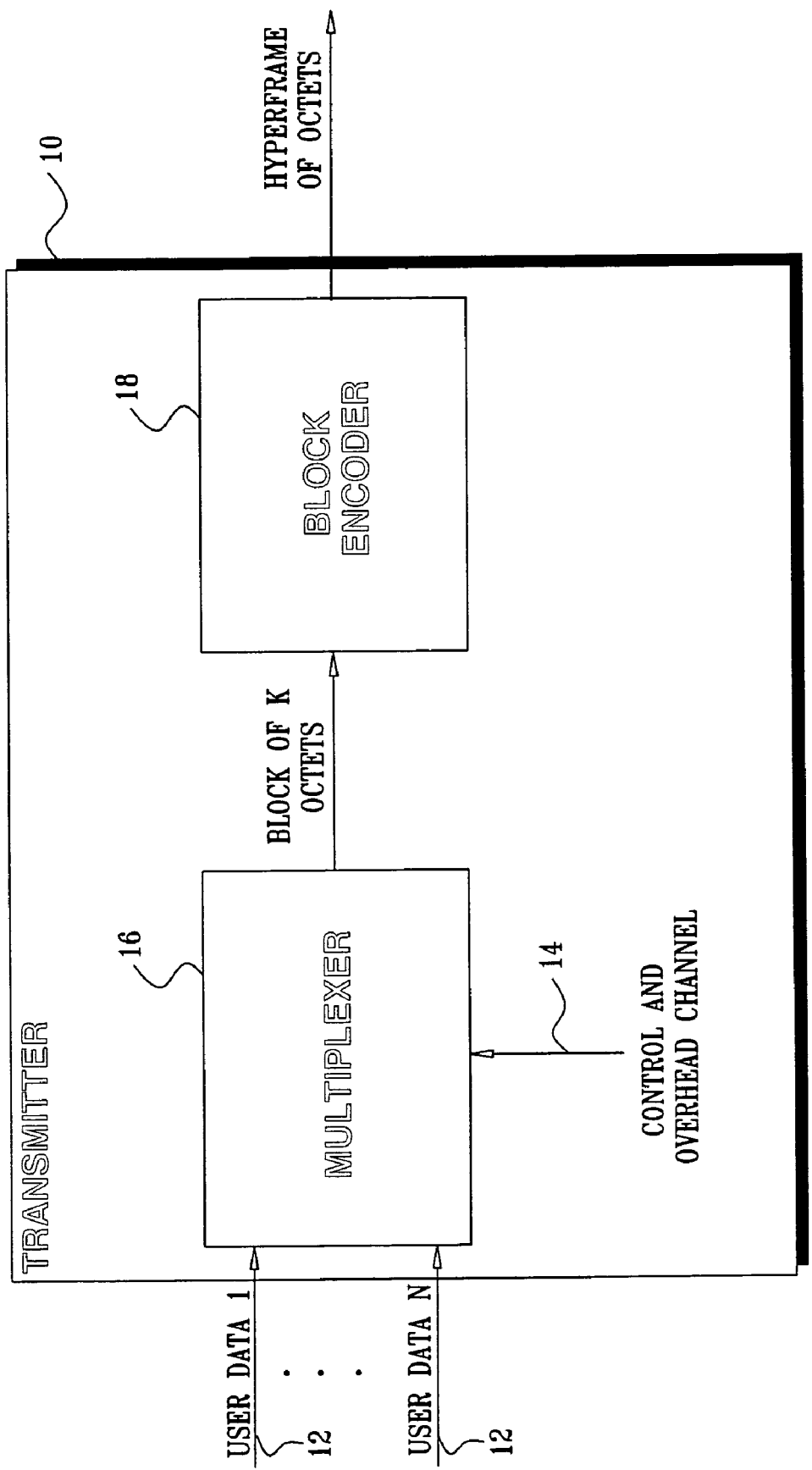
FIG. 1 is a block diagram of a transmitter of framed data, which is constructed and operative in accordance with a disclosed embodiment of the invention.

Turning now to the drawings, reference is initially made to FIG. 1, which is a block diagram of a transmitter 10 that outputs framed data, which is constructed and operative in accordance with a disclosed embodiment of the invention. In digital communications systems like ADSL and VDSL, several data sources are combined together into frames having a fixed block size. The data sources in this case include both user data channels 12 (also known as data bearers) and overhead, for example, data and forward error correction (FEC) parity bytes transmitted over an overhead channel 14. Any number and combination of user data channels 12 can be accommodated. The user data channels 12 can be transmitted according to many different protocols, e.g., encoded voice over a pulse code modulation (PCM) channel, Ethernet packets encapsulated into an asynchronous transfer mode (ATM) cell. Data arriving via the user data channels 12 and the overhead channel 14 all enter a multiplexing unit 16. The multiplexing unit organizes the data into blocks of K basic transmission units, typically octets, which are referred to herein as FEC data frames (FDF). The basic units can have formats other than octets, e.g., bits, 16 bit words, or arbitrary units, as described below. The blocks are then fed into a block encoder 18, which adds R parity octets (or other basic units) to yield N=K+R octets (or other basic units).

The multiplexing unit 16, which is conventional, handles the task of mixing the different data sources to assemble a FDF. The multiplexing unit 16 is capable of multiplexing different data sources according to the allocations that are assigned in accordance with the various embodiments of the invention disclosed hereinbelow. The multiplexing unit 16 and the block encoder 18 can be configured to conform to the framing requirements of many different protocols. Thus, a FDF could be identical to a MDF. In other cases, a plurality of MDF's are combined to form one FDF. All of these possibilities may be referred to herein as a frame.

The multiplexing unit 16 and the block encoder 18 have the capability of multiplexing at least two latency paths, and at least two bearer channels per latency path. They can be configured to flexibly assign RS codeword parameters in each latency path, and can vary the overhead channel bit rate. Provision may be made for varying the number of octets (or other basic units) in different frames. It is also desirable that the multiplexing unit 16 and block encoder 18 have performance monitoring facilities. Alternatively, they be should be compatible with conventional performance monitoring and reporting tools.

For example, a basic multiplexing operation that provides constant allocations of octets from the different sources assigns octets to frames based on the set of parameters $\{k_1, \ldots, k_N, k_c\}$, wherein $k_n$ is the number of octets from the $n^{th}$ user data source to be placed in each frame, and $k_c$ is the number of octets from the control channel placed in each frame, and $$K = \sum_{n=1}^{N} K_n + K_c.$$

An example of a more complicated multiplexer is given for ADSL2 in the above-noted ITU-T recommendation G.992.3. The multiplexer control uses the following parameters:

$B_1, \ldots, B_N$—The numbers of octet from each user data source per subframe, e.g., a MDF.

M—The number of subframes in each frame.

T—The ratio between subframes and control octets.

This multiplexer constructs a frame from subframes, which here comprise the above-noted basic units. Each MDF carries $$G = \sum_{n=1}^{N} B_n + 1$$

octets. There are M subframes in a frame, giving the relation K=M*G, where the operator "*" represents multiplication. It is evident from the preceding formula that one octet is assigned to carry the control channel information in each subframe. However, in practice only each $T^{th}$ subframe actually uses this octet to carry the control channel. In all other subframes, this octet is assigned to one of the user data channels. Keeping K fixed, the set of constraints imposed by such a framing structure hampers the maintenance of fine control of the control channel transmission rate.

Embodiment 1

Figure 2:
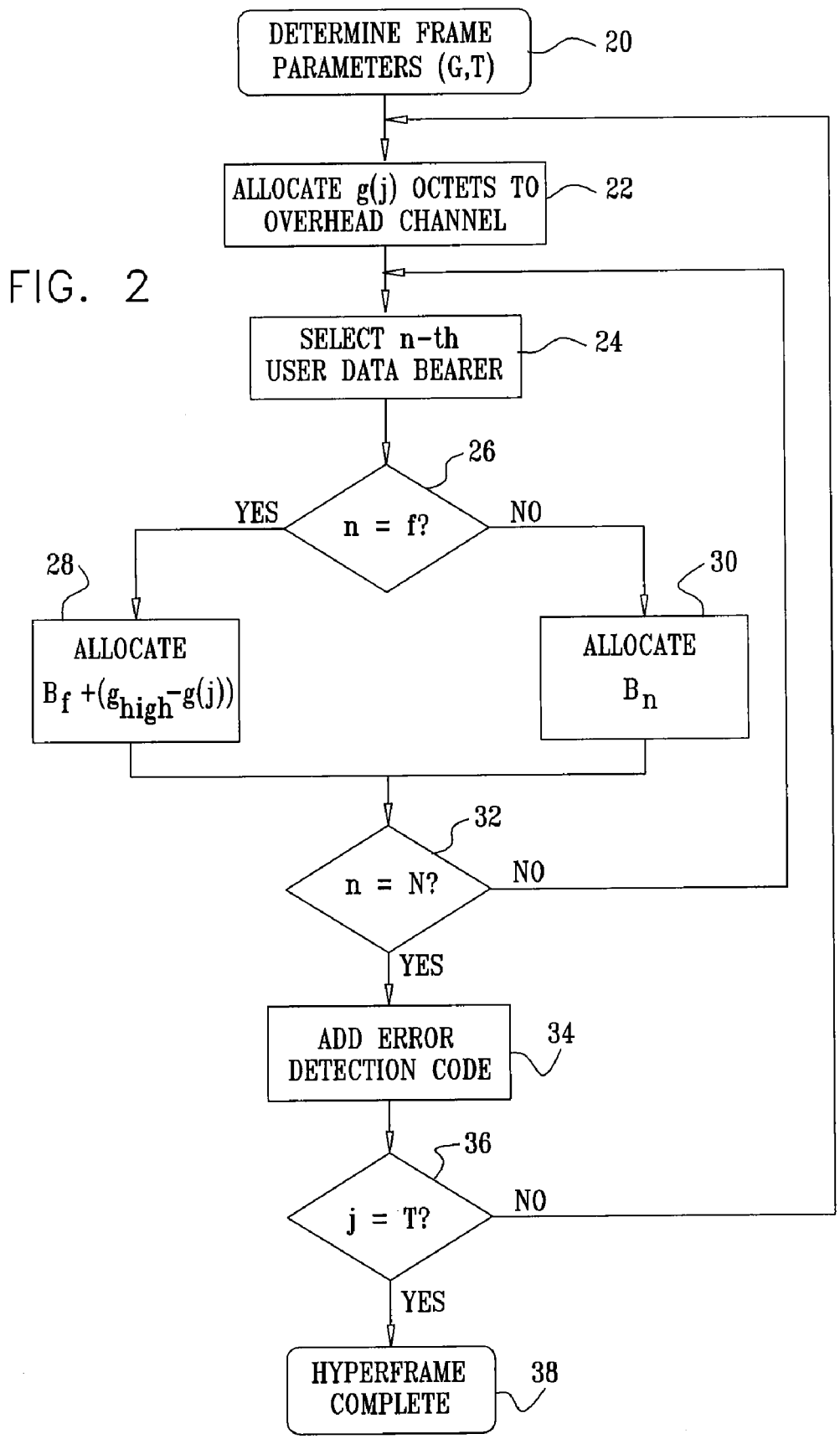
FIG. 2 is a flow chart describing the construction of a framing structure allowing flexible allocation of an overhead channel in accordance with a disclosed embodiment of the invention.

Reference is now made to FIG. 2, which is a flow chart describing the construction of a framing structure allowing flexible allocation of an overhead channel in accordance with a disclosed embodiment of the invention. The process steps are shown in a particular sequence for clarity of presentation. However, it will be evident to those skilled in the art that many of them can be performed in parallel, asynchronously, or in different orders.

The frame according to this embodiment is constructed based on the following set of parameters, which are determined at initial step 20. Although octets are specified representatively, the invention is not limited to octets, and the inventive frame can be constructed using any basic unit as described above.

$B_1, \ldots, B_N$—The number of octets from each user data bearer per frame.

G—The number of control channel octets to be passed in a hyperframe composed of T frames.

T—The number of frames in a hyperframe.

Modems often influence the details of the framing structure. A modem is normally configured by a management entity that passes a set of parameters describing, e.g., required minimum and maximum rates for each latency path, correspondence between data bearer channels and latency paths, any divisions of bit rate among the data bearers, maximal latency, any minimum required latency, and required overhead rate. In the case of a receiver, during modem initialization, line conditions are tested, and achievable rates estimated.

Based on the achievable rate and the configuration passed from the management entity, the receiver (or transmitter) calculates an appropriate framing structure and passes a set of parameters that describes this structure to the other side. This can be a one-time process or an iterative process, in which the two sides, the transmitter and receiver, negotiate the parameters.

More specifically, when entering ShowTime mode both receiving and transmitting modems use the set of parameters to modulate and demodulate the data.

In some cases the set of parameters can be changed during ShowTime mode. In this case a message conveying the new parameters should be passed, generally using the over-head channel.

A transmitter accordingly receives the parameters G and T during the initialization stage, or during a data transmission period in case of a dynamic change of parameters as described hereinbelow. The transmitter uses this set of parameters to transmit multiplexed data frames that are constructed based on the frame structure defined below. Alternatively, the transmitter can calculate the parameters G and T, and send them to the receiver using a control channel.

Based on this set of parameters the method continues at step 22, which begins the construction of a $j^{th}$ frame. At step 22, g(j) octets from the overhead control channel are allocated.

The value g(j) is calculated according to the following formula:

$$g(j) = \left\lfloor \frac{(t+1) \cdot G}{T} \right\rfloor - \left\lfloor \frac{t \cdot G}{T} \right\rfloor$$

$$t = (j - \text{base}) \bmod T,$$

where the operator $\lfloor \ \rfloor$ stands for round down (also known as the floor function), and 'base' is an offset to the index j that affects the value upon which the modulo operation is to be performed. In the simplest case, the value of base is 0. Alternatively, the value of t can also be derived from a modulo counter having a period T. It is evident that the value g(j) is generally unequal in different frames.

In some embodiments, framing parameters may be changed adaptively, for example changes in the values of G and T, as well as other framing parameters. A change in the value of T may result in a change in the value of base. Ultimately, dynamic changes in the hyperframe size result. This is advantageous in maximizing transmission efficiency when loads of the user data bearers fluctuate.

Next, at step 24 the $n^{th}$ user data bearer is selected, wherein n is an index that changes at each iteration of step 24.

Next at decision step 26 it is determined whether the user data bearer that was chosen in step 24 is a particular user data bearer f. The identification of the user data bearer f can be fixed, based on a predefined criterion, e.g., the lowest or highest value of the index n. Alternatively, the user data bearer f can be an intermediate data bearer, and can be communicated between a receiver and a transmitter, as with other framing parameters.

If the determination at decision step 26 is affirmative, then control proceeds to step 28. Octets are allocated to the user data bearer f. The allocation is calculated as $B_f + (g_{high} - g(j))$ octets, wherein $$g_{high} = \left\lceil \frac{G}{T} \right\rceil,$$

and the operator $\lceil \ \rceil$ stands for round up (also known as the ceil function).

If the determination at decision step 26 is negative, then control proceeds to step 30. $B_n$ octets are allocated to the current user data bearer. The value $B_n$ is typically acquired during initialization, as described above.

Following the performance of either step 28 or step 30, control proceeds to decision step 32, where it is determined if all user data bearers have been processed. If the determination at decision step 32 is negative, then control returns to step 24 to process the next user data bearer.

If the determination at decision step 32 is affirmative, then the current frame is complete. Then, at step 34, error detection or correction bytes are added to the current frame. In some applications, in which RS redundancy is not required, step 34 can be omitted. In other applications, FEC redundancy may be added to a group of several data frames.

Control then proceeds to decision step 36, where it is determined if all frames required to complete the current hyperframe have been assembled.

If the determination at decision step 36 is negative, then control returns to step 22 to begin assembly of the next frame.

If the determination at decision step 36 is affirmative, then the method terminates at final step 38, where the current hyperframe is determined to be complete.

Embodiment 2

This embodiment is similar to Embodiment 1, except that g(j) is defined as follows:

$$g(j) = \begin{cases} \left\lceil \frac{G}{T} \right\rceil & t < (G \bmod T) \\ \left\lfloor \frac{G}{T} \right\rfloor & \text{otherwise} \end{cases}$$

Embodiment 3

This embodiment is similar to Embodiment 1, except that g(j) is defined as follows:

$$g(j) = \begin{cases} \left\lfloor \frac{G}{T} \right\rfloor & t < (T - (G \bmod T)) \\ \left\lceil \frac{G}{T} \right\rceil & \text{otherwise} \end{cases}$$

The advantage of the first embodiment over the latter two is that it imposes minimal jitter on the data bearer f (one octet/MDF)). In the second and third embodiments, jitter can be as great as G/2 octets/MDF. On the other hand, the derivation of g(j) is much simpler in the latter two embodiments.

Latency Paths.

Often it is required to construct frames involving more than one latency path, for example when there are different physical interfaces, e.g. ATM, STM. Also, Different latency paths may have different RS codeword parameters and, consequently, independent and uncoupled framing formats. An assigned number of bits from the buffer of each latency path are loaded into each DMT symbol. Furthermore, some latency paths may be interleaved, while others are not.

Reference is now made to FIG. 3, which is a flow chart describing construction of a DMT symbol by multiplexing different user data bearers and overhead data based on a frame structure that is defined by framing parameters in accordance with a disclosed embodiment of the invention.

At initial step 40 framing parameters are established as described above.

Next, at step 42 a latency path is selected. As noted above, a serial format is used in FIG. 3 only for clarity in presenting certain principles of the present invention. While FIG. 3 might suggest that frames from different latency paths are constructed in sequence, or are synchronous, in actuality this is not generally the case. Thus, start and end times of frames arriving on different latency paths do not usually coincide. In practice, frames from different paths are constructed independently of one another in time. The process of frame construction for a given latency path may be based on the progress in the transmission of previous frames belonging to the same path. Triggers to the process of constructing a new frame can be, for example, the completion of transmission of a previous block in the same path, or an event that the transmission buffers have filled to a particular level. Many other triggers will occur to those skilled in the art.

Next, at step 44 one or more data frames are constructed from the current latency path. The number of frames is set according to the framing parameters and/or the framing protocol being used.

Next, at step 46 a FEC codeword, for example, a RS codeword, is constructed from the data frames prepared at step 44 by adding FEC redundancy octets. In some applications RS redundancy is not required, in which case step 46 can be omitted. In other applications, FEC redundancy may be added to a group of several data frames.

Control now proceeds to decision step 48, where it is determined if the current frame needs to be interleaved. If the determination at decision step 48 is negative, then control proceeds directly to decision step 50, which is described below.

If the determination at decision step 48 is affirmative, then control proceeds to step 52, where interleaving is performed. Control then proceeds to decision step 50.

At decision step 50, it is determined if more latency paths need to be processed. If the determination at decision step 50 is affirmative, then control returns to step 42.

If the determination at decision step 50 is negative, then control proceeds to final step 54. A DMT symbol is constructed by multiplexing the data coming from the different latency paths.

Frame Reception.

In any of the above-described embodiments, a receiver can calculate the values of the parameters G and T based on the required overhead channel rate, once the framing parameters G and T have been obtained by the transmitter during the initialization stage, or during the data transmission period in case of a dynamic change of parameters. The receiver uses these parameters to receive and demultiplex data based on the frame structure defined above. Alternatively, the receiver may obtain the parameters G and T directly from the transmitter.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of digital communication by transmitting multiplexed user data from user data channels and control data from a control channel, comprising the steps of:

predefining a first number of frames that are to make up each hyperframe in a sequence of hyperframes and a second number of basic transmission units of said control data to be passed in each said hyperframe;

assigning, responsively to said predefined first and second numbers, a third number of said basic transmission units to said control channel in a first data frame of a hyperframe;

assigning, responsively to said third number, a fourth number of said basic transmission units to a selected one of said user data channels in said first data frame;

assigning respective fifth numbers of said basic transmission units to all others of said user data channels in said first data frame;

multiplexing said third number of said basic transmission units of said control channel, said fourth number of said basic transmission units of said user data channels, and said fifth numbers of said basic transmission units of said user data channels to define said first data frame;

using new control data from said control channel and new user data from said user data channels, repeating said steps of assigning a third number responsively to said predefined first and second numbers, assigning a fourth number, and multiplexing to define at least one second data frame in said hyperframe, wherein said third number in said first data frame differs from said third number in said second data frame; and transmitting said first data frame and said at least one second data frame to a receiver.

2. The method according to claim 1, wherein said first data frame and said second data frame each have a respective index in each said hyperframe, and said third number of said first data frame and said third number of said second data frame are calculated according to said respective index thereof.

3. The method according to claim 1, wherein said fourth number depends on said third number.

4. The method according to claim 1, wherein said selected one of said user data channels has a highest index number among said user data channels.

5. The method according to claim 1, wherein said selected one of said user data channels has a lowest index number among said user data channels.

6. The method according to claim 1, wherein said basic transmission units are octets.

7. The method according to claim 1, further comprising the steps of transmitting a total number of said basic transmission units from said control channel to be transmitted in said hyperframe and a number of data frames that are assembled into said hyperframe to said receiver.

8. A transmission apparatus for transmitting multiplexed user data from user data channels and control data from a control channel, comprising:

a multiplexer, operative to perform the steps of:

receiving a definition of a first number of frames that are to make up each hyperframe in a sequence of hyperframes and a second number of basic transmission units of said control data to be passed in each said hyperframe;

assigning, responsively to said predefined first and second numbers, a third number of said basic transmission units to said control channel in a first data frame of a hyperframe;

assigning, responsively to said third number, a fourth number of said basic transmission units to a selected one of said user data channels in said first data frame;

assigning respective fifth numbers of said basic transmission units to all others of said user data channels in said first data frame;

multiplexing said third number of said basic transmission units of said control channel, said fourth number of said basic transmission units of said user data channels, and said fifth numbers of said basic transmission units of said user data channels to define said first data frame;

using new control data from said control channel and new user data from said user data channels, repeating said steps of assigning a third number responsively to said predefined first and second numbers, assigning a fourth number, and multiplexing to define at least one second data frame in said hyperframe, wherein said third number in said first data frame differs from said third number in said second data frame; and a block encoder operative to assemble an output of said multiplexer into said hyperframe for transmission thereof to a receiver.

9. The transmission apparatus according to claim 8, wherein said first data frame and said second data frame each have a respective index in each said hyperframe, and said third number of said first data frame and said third number of said second data frame are calculated according to said respective index thereof 10. The transmission apparatus according to claim 8, wherein said fourth number depends on said third number.

11. The transmission apparatus according to claim 8, wherein said selected one of said user data channels has a highest index number among said user data channels.

12. The transmission apparatus according to claim 8, wherein said selected one of said user data channels has a lowest index number among said user data channels.

13. The transmission apparatus according to claim 8, wherein said basic transmission units are octets.

14. The transmission apparatus according to claim 8, further comprising the steps of transmitting a total number of said basic transmission units from said control channel to be transmitted in said hyperframe and a number of data frames that are assembled into said hyperframe to said receiver.

* * * * *